United States Patent [19]
Busch et al.

[11] Patent Number: 6,101,160
[45] Date of Patent: Aug. 8, 2000

[54] RECORD STORAGE ARRANGEMENT HAVING SPRING COUPLED CLOSURE MEMBER FOR PREVENTING ACCESS DURING AN OPERATING CONDITION

[75] Inventors: Andreas W. Busch, Guntramsdorf; Peter Wagner, Vienna, both of Austria

[73] Assignee: U.S. Philips Corporation, New York, N.Y.

[21] Appl. No.: 08/649,935

[22] Filed: May 14, 1996

[30] Foreign Application Priority Data

May 15, 1995 [DE] Germany ............................ 952 01 259

[51] Int. Cl.[7] .................................................. G11B 33/02
[52] U.S. Cl. ............................................................ 369/77.2
[58] Field of Search .................................. 369/75.1, 77.2; 360/96.5, 96.6

[56] References Cited

U.S. PATENT DOCUMENTS 4,530,081  7/1985  Sakurai et al. ......................... 369/75.1
5,532,996  7/1996  Okabe et al. ............................ 369/77.2

FOREIGN PATENT DOCUMENTS

0128629A2  12/1984  European Pat. Off. .
204585A1   12/1986  European Pat. Off. .
578536A2    1/1994  European Pat. Off. .
3728475A1   3/1989  Germany .

*Primary Examiner*—George J. Letscher
*Attorney, Agent, or Firm*—Leroy Eason

[57] ABSTRACT

A holding arrangement for a record storage medium includes a holding member, a housing with an aperture therein for loading the record storage medium into the holding member and removing it therefrom, and a closure member which is supported on and spring coupled to the holding member so as to be movable therewith to close the loading aperture when the holding member is moved from a loading condition to an operating condition. Movement of the holding member to a loading condition causes the closure member to open the loading aperture. The spring coupling permits a degree of freedom of movement of the closure member so that correct positioning thereof is not dependent on the accuracy of positioning of the holding member.

9 Claims, 5 Drawing Sheets

RECORD STORAGE ARRANGEMENT HAVING SPRING COUPLED CLOSURE MEMBER FOR PREVENTING ACCESS DURING AN OPERATING CONDITION

BACKGROUND OF THE INVENTION

1. Field of the Invention

The invention relates to a holding arrangement having at least one housing wall formed with an access opening and also having holding means which comprise a holding space for holding a record storage medium, the holding means being guided so as to be movable in a direction parallel to a direction of movement through the access opening. The holding means are movable between a loading position in which the record storage medium can be inserted into the holding means and is removable therefrom, and an operating position in which the record storage medium occupies an operating position. Closure means are coupled to the holding means and are movable between an open position, which is occupied when the holding means is in the loading position and in which the closing means is remote from the access opening in the housing wall, and a closed position which is occupied when the holding means is in the operating position and in which the closing means closes the access opening in the housing wall. Drive means act upon the holding means to move it between the loading and operating positions.

2. Description of the Related Art

Such a holding arrangement for use with magnetic-tape cassettes is known, for example, from DE-A1-37 28 475. In the known apparatus the holding means and the closing means are fixedly connected to one another. The holding means comprise a drawer into which a magnetic-tape cassette can be loaded and which is guided so as to be movable in a substantially horizontal direction through an access opening in a vertical housing wall of the apparatus. The closing means comprise a front wall of the drawer, which front wall extends in a substantially vertical direction and is fixedly connected to two side walls and a bottom wall of the drawer. As a result of this construction, for example owing to unfavorable tolerances, it is possible for the holding means to have already reached its operating position before the closing means has reached its closed position, whereby the access opening in the housing wall of the known apparatus is not closed correctly.

SUMMARY OF THE INVENTION

It is an object of the invention to solve the abovementioned problems and to improve a holding arrangement of the type defined in the opening paragraph in a simple manner so as to ensure that the access opening in the housing wall of the arrangement is always closed correctly. To this end, according to the invention, the closing means and the holding means are moveable relative to one another at least parallel to the direction of movement of the holding means through the access opening. The closing means and the holding means occupy a first relative position with respect to one another when the holding means are in the loading position and the closing means are in the open position. The closing means and the holding means occupy a second relative position with respect to one another when the holding means are in the operating position and the closing means are in the closed position. The closing means and the holding means are restrained with respect to one another by spring means which, when the holding means are in the operating position, hold the closing means, which is then in the closed position, in said closed position by spring force. Thus, it is achieved simply and at low cost that the closed position of the closing means and the operating position of the holding means are substantially independent of one another and that in the operating position of the holding means the closing means, which have then been moved to the closed position, are held in the closed position in a correct and play-free manner by the spring means, thereby ensuring that the access opening in the housing wall of the holding arrangement is always closed properly. The holding arrangement in accordance with the invention has the advantage that dimensional tolerances of the holding means and the closing means do not affect a proper closure of the access opening in the housing wall. A further advantage is that if during the movement of the holding means to the operating position the closing means are inadvertently impeded by hand—which may be the case, for example, if during movement of the holding means to the operating position a user attempts to remove a previously inserted record storage medium from the holding means and his fingers are caught between the housing wall of the arrangement and the closing means—the closing means only exert the force produced by the spring means on the fingers. The fingers can therefore readily be withdrawn from this position, after which under the influence of the force of the spring means the closing means are moved into the closed position and are held in this position reliably and without play, thereby ensuring that ultimately the access opening in the housing wall of the holding arrangement is also closed properly.

It is to be noted that EP-A2-0 128 629 discloses an apparatus comprising a housing having a housing wall formed with an access opening, holding means for holding a record storage medium in the form of a disc-shaped optically scanned record carrier, which holding means are movable in a direction parallel to a direction of movement through the access opening, and closing means provided to close the access opening and connected to the holding means. The known apparatus comprises also drive means which act upon the closing means. The holding means and the closing means are arranged to be movable relative to one another by guide means formed by slots which extend obliquely relative to the direction of movement and by pins which engage the slots, so that when the closing means is driven by the drive means the holding means is moved via the guide means. That is not the case in an arrangement in accordance with the invention, wherein the drive means act directly upon the holding means. Moreover, the apparatus known from EP-A2-0 128 629 does not comprise spring means which restrain the closing means and the holding means relative to one another and, consequently, the closing means is not spring-loaded into the closed position when the holding means is in the operating position. Thus, this known apparatus does not have the advantages of a holding arrangement in accordance with the invention.

In an advantageous embodiment of a holding arrangement in accordance with the invention the closing means is arranged on the holding means so as to be additionally movable substantially transversely to the direction of movement of the holding means through the access opening, and during movement of the holding means into the loading position the closing means is movable into the open position with the aid of the spring means transversely to the direction of movement of the holding means through the access opening. Such an embodiment has the advantage that the holding means has to be moved out of the arrangement through the access opening in the housing wall over a comparatively small distance in order to allow the insertion of a record storage medium into the holding means. Also, insertion of a storage medium into the holding means is possible substantially parallel to the direction of movement of the holding means through the access opening, which is desirable and advantageous for many uses of a holding arrangement in accordance with the invention.

In a holding arrangement in accordance with the invention as described above it has proved to be particularly advantageous if the holding means includes at least one stop by which the closing means are positioned in the open position under the influence of the force of the spring means. This ensures that also in the open position the closing means is positioned accurately and without play.

In a further embodiment of a holding arrangement in accordance with the invention the closing means and the holding means, which are movable relative to one another at least substantially parallel to the direction of movement of the holding means through the access opening, are disengageably coupled to one another. During movement of the holding means into the operating position and the resulting movement of the closing means, which are disengageably coupled to the holding means, into the closed position, the holding means are disengageable from the closing means and are movable into their operating position opposed by the force of the spring means after the closing means have reached the closed position. In this way it is achieved that the holding means are movable relative to the closing means in a particularly independent manner and that in the closed position of the closing means the holding means can be moved, for example, not only substantially parallel to the direction of movement of the holding means through the access opening but also along a path of movement which is inclined relative to this direction of movement, without being hindered by the closing means.

In such embodiment it has proved to be advantageous for the closing means to be guided by guide means so as to be movable relative to the movably guided holding means in a direction substantially parallel to the direction of movement of the holding means through the access opening. This has proved to be advantageous for a simple and reliable implementation.

The guide means may be arranged between the holding means and the closing means. It has proved to be particularly advantageous if the guide means are disposed between first guide-means supports which are connected to the closing means and second guide-means supports which are stationarily mounted in the arrangement. This is advantageous for a particularly reliable and accurate guidance of the closing means.

After the disengagement of the closing means, opposed by the force of the spring means, the holding means is additionally movable into its operating position transversely to the direction of movement of the holding means through the access opening. It is thus achieved in a particularly simple manner that the holding means together with the record storage medium held therein can first be moved over the scanning means and, if applicable, the drive means for the record storage medium in a direction parallel to the direction of movement of the holding means through the access opening. After this, it can be move towards the scanning means and, if applicable, the drive means for the record storage medium in a direction transverse to the direction of movement of the holding means through the access opening, as is desired in many cases.

In such an arrangement it has proved to be advantageous if at least one lever arm is pivotably mounted on the holding means and the spring means act upon the lever arm. This makes it possible to provide an excursion of the spring means which differs from and is preferably smaller than the displacement of the holding means.

In this respect it has proved to be particularly advantageous if the lever arm carries a stop which in the operating position of the holding means faces an associated stop connected to the closing means and thereby guards the closing means against a movement of these means out of their closed position in opposition to the force of the spring means. In this way the closing means are locked in their closed position after the movement of the holding means into their operating position, which precludes an undesirable movement of the closing means out of their operating position against the force of the spring means.

DESCRIPTION OF THE DRAWINGS

The invention will now be described in more detail with reference to the drawings which show three embodiments given by way of examples and to which the invention is not limited.

DETAILED DESCRIPTION OF THE PREFERRED EMBODIMENTS

Figure 1:
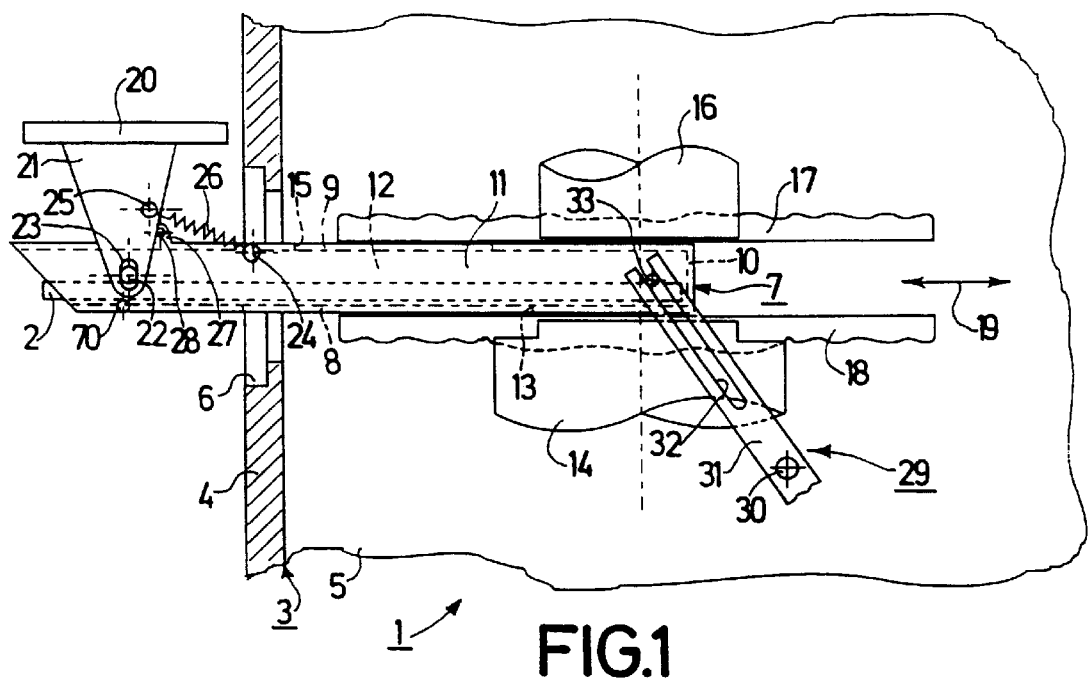
FIG. 1 shows a holding arrangement in accordance with a first embodiment of the invention as used in a reproducing apparatus for playing a disc-shaped optically scanned record carrier . Only the relevant part of this apparatus is shown, and in an operating condition in which the holding means for the record carrier is in the loading position and the closing means for closing an access opening in a housing wall of the apparatus is in their open position.
Figure 2:
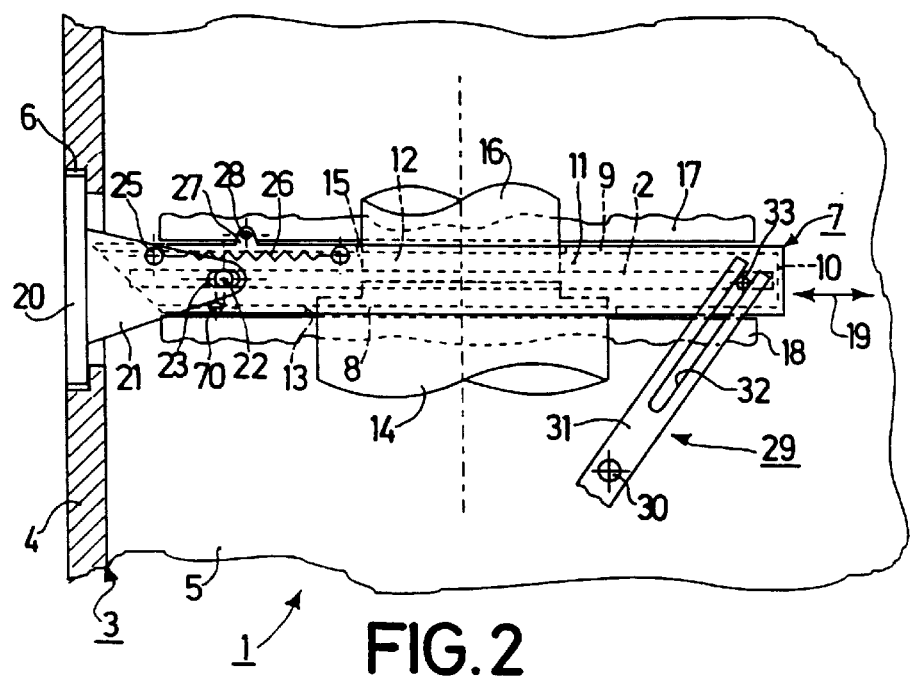
FIG. 2 shows the same reproducing apparatus as in FIG. 1, the holding means being in the operating position and the closing means being in the closed position.

FIGS. 1 and 2 show a relevant part of a reproducing apparatus 1 for playing a disc-shaped optically scanned record carrier 2. The apparatus 1 comprises a housing 3, of which FIGS. 1 and 2 show a front wall 4 and a side wall 5. The front wall 4 has an access opening 6.

The apparatus 1 comprises holding means 7 for holding a disc-shaped optically scanned record carrier 2 which serves as a record storage medium. In the present case the holder means 7 are of the sliding type and comprise a bottom wall 8, an upper wall 9, a rear wall 10 and two side walls 11, of which only one side wall 11 is visible in FIGS. 1 and 2. The walls 8, 9, 10 and 11 bound a holding space 12 intended and formed to hold a record carrier 2. The bottom wall 8 of the holding means 7 has a circular hole 13 through which the diagrammatically shown drive means 14 of the apparatus 1 can cooperate with a record carrier 2. The upper wall 9 of the holding means 7 has a further circular hole 15 through which diagrammatically shown hold-down means 16 can cooperate with the record carrier 2 to hold it down on the drive means 14.

The holding means 7 are guided by guide means 17 and 18, shown diagrammatically, so as to be movable in a direction parallel to the direction of movement through the access opening 6 indicated by a double arrow 19. The holding means 7 are movable between a loading position as shown in FIG. 1, in which the record carrier 2 can be inserted into and withdrawn from the holding space 12 in said holding means 7, and an operating position as shown in FIG. 2, in which the record carrier 2 occupies an operating position.

The apparatus 1 further comprises closing means 20, which is simply formed by a flat plate in the apparatus 1 shown in FIGS. 1 and 2. The closing means 20 are connected to the holding means 7. For this purpose the closing means 20 have two substantially triangular extensions 21 which project laterally from the closing means 20, which extensions extend parallel to the side walls 11 of the holding means 7 and enclose the holding means 7 in a bracket-like manner at the location of the side walls 11 of these means. Each of the two side walls 11 of the holding means 7 carries a laterally projecting cylindrical pin 22. Each pin 22 engages in a slot 23 in an extension 21. The longitudinal directions of the slots 23 extend substantially perpendicularly to the closing means 20. By means of the extension 21, the pins 22 and the slots 23, the closing means 20 are movably coupled to the holding means 7 in such a manner that the closing means 20 and the holding means 7 are movable relative to one another in a direction parallel to the direction of movement 19 and also substantially transversely to the direction of movement 19.

Each of the two side walls 11 of the holding means 7 also carries a laterally projecting further pin 24. Moreover, each of the extensions 21 carries a laterally projecting pin 25. A tension spring 26 is coupled between each of the pins 24 and each of the pins 25. The two tensions springs 26 form spring means which restrain the closing means 20 and the holding means 7 relative to one another. A raised portion 27, which is disposed parallel to the direction of the respective side wall 11, projects from the holding means 7 at the location of the transition from each side wall 11 to the upper wall 9. A further pin 28 projects perpendicularly from each of the raised portions 27. The two further pins 28 serve for cooperation with the extensions 21.

The closing means 20 is movable between an open position shown in FIG. 1, when the holding means is in the loading position and closing means 20 is remote from access opening 6 in the housing wall 4, and a closed position shown in FIG. 2, when the holding means is in the operating position and closing means 20 closes the access opening 6 in the housing wall 4. In the open position of the closing means 20 the extensions 21 engage against the further pins 28 under the influence of the two tension springs 26, so that the closing means 20 is positioned accurately and without play in its open position. In the closed position the closing means 20 is disposed in the access opening 6 in housing wall 4, and is held accurately and without play in this closed position by means of the spring force of the two tension springs 26. A safety pin 70 may project laterally from each side wall 11 of the holding means 7 for cooperation with a respective extension 21 in order to prevent the closing means 20 from being pivoted counterclockwise out of the closed position shown in FIG. 2. In the closed position of the closing means 20 the extensions 21 do not engage with the safety pins 70 but there is a small distance between the extensions 21 and the safety pins 70, so that the safety pins 70 do not affect the closed position of the closing means 20.

To drive the holding means 7 the apparatus 1 shown in FIGS. 1 and 2 comprises drive means 29 which include a motor, not shown. The drive means 29 include a drive lever 31 which is pivotable about a spindle 30 and has a slot 32, which is engaged by a drive pin 33 which projects laterally from a side wall 11 of the holding means 7. When the drive lever 31 is pivoted from its position shown in FIG. 1 to its position shown in FIG. 2 the holding means 7 are moved out of the loading position and, at the same time, the closing means 20 is moved from its open position to its closed position.

When the drive means 29 are activated to move to the operating condition shown in FIG. 2 the drive lever 31 is pivoted clockwise, as viewed in FIG. 1, as a result of which the holding means 7 is moved from its loading position towards its operating position parallel to the direction of movement 19. After a short part of this movement of the holding means 7 the closing means 20 will abut against the front wall 4, so that as the movement of the holding means 7 continues the closing means 20 are pivoted counterclockwise, as viewed in FIG. 1, opposed by the force of the tension springs 26. In the operating condition the slots 23 ensure that the holding means 7 is independent of the closing means 20, i.e. the holding means 7 is positioned with the aid of the drive means 29 and the closing means 20 is positioned with the aid of the tension springs 26. Under the influence of the tension springs 26 the closing means 20 is held in the closed position without play, thereby guaranteeing that the access opening 6 in the front wall 4 is closed effectively.

If the drive means 29 is activated when holding means 7 is in the operating condition shown in FIG. 2, the drive lever 31 is pivoted counterclockwise, as viewed in FIG. 2. That moves the holding means 7 from its operating position towards its loading position parallel to the direction of movement 19. Since the tension springs 26 act eccentrically on the extensions 21 this causes closing means 20 to be pivoted clockwise, as viewed in FIG. 2, the closing means 20 being initially positioned against the front wall 4. Towards the end of the movement of the holding means 7 the further pins 28 will abut against the extensions 21, as a result of which the pivotal movement of the extensions 21 and, consequently, of the closing means 20 stops and the closing means 20 are eventually moved away from the front wall 4 until they occupy their open position shown in FIG. 1, the holding means 7 then being in the loading position, in which it is held by the drive means 29, which has then been stopped.

Figure 3:
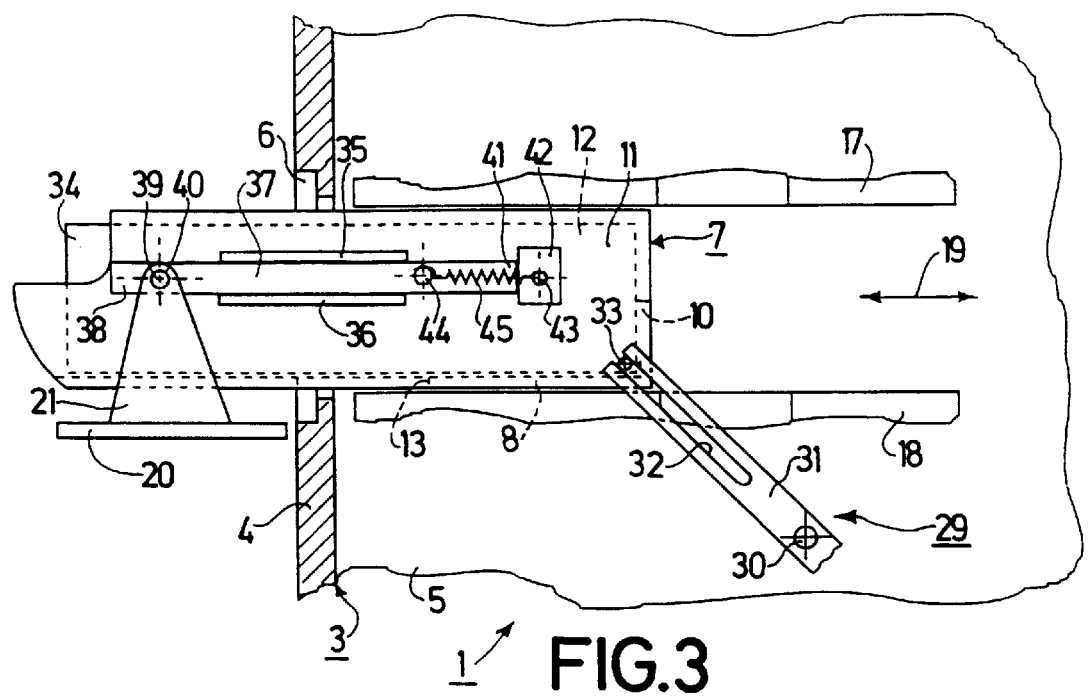
FIG. 3 shows a holding arrangement in accordance with a second embodiment of the invention as used in a recording and reproducing apparatus for a magnetic-tape cassette, holding means for the magnetic-tape cassette being shown in the loading position and closing means for closing an access opening in a housing wall of the apparatus being shown in the open position.
Figure 4:
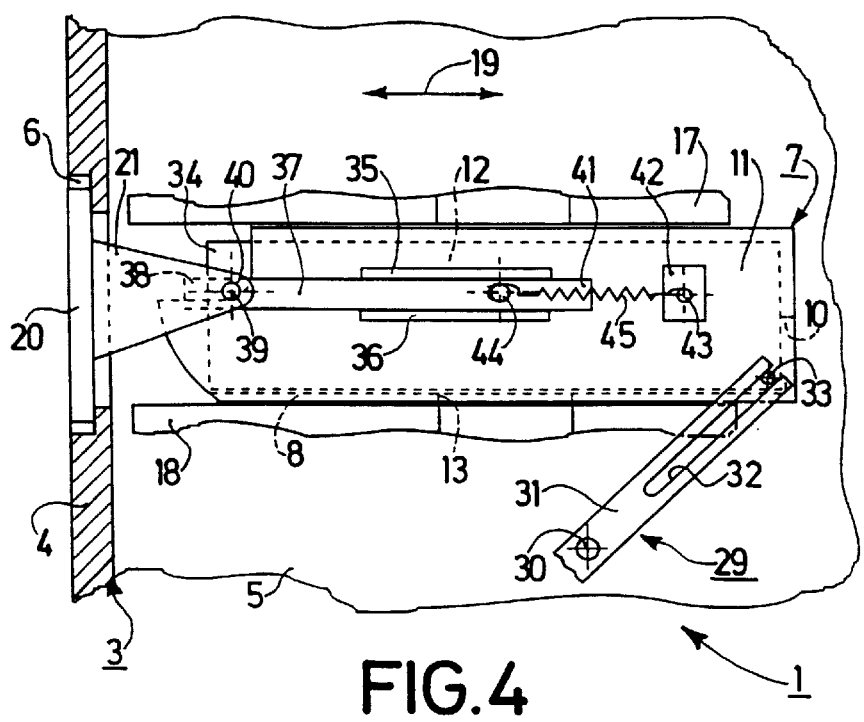
FIG. 4 shows the same recording and reproducing apparatus as in FIG. 3, the holding means being in the operating position and the closing means being in their closed position.

FIGS. 3 and 4 show another show another apparatus 1 for use in conjunction with a record storage medium. That apparatus is intended for use with a magnetic-tape cassette 34 which accommodates a storage medium in the form of a magnetic tape which is to be scanned magnetically.

The apparatus 1 shown in FIGS. 3 and 4 comprises holding means 7 which is basically constructed as a drawer having a bottom wall 8, a rear wall 10 which extends over only part of the height of a magnetic-tape cassette 34, and two side walls 11. However, it does not comprise an upper wall. The holding means 7 is guided by two guides 17 and 18 so as to be movable parallel to a direction of movement 19.

The apparatus 1 also comprises closing means 20, which are simply formed by a flat panel. The closing means 20 are coupled to the holding means 7 by means of two lateral extensions 21. To couple the closing means 20 to the holding means 7 a slide 37 is guided on each side wall 11 of the holding means 7 so as to be movable parallel to the direction of movement 19 by means of two guide members 35 and 36 connected to each respective side wall 11. At an end 38 each slide 37 carries a laterally projecting pin 39, which engages a hole 40 in each extension 21, as a result of which the extensions 21 and consequently the closing means 20 are pivotable relative to the slides 37. The other end 41 of each of the two slides 37 is adapted to cooperate with a stop 42, which each project from one of the two side walls 11. Each of the two stops 42 carries a laterally projecting pin 43 and each slide 37 carries a laterally projecting further pin 44. A tension spring 45 is coupled to between each pin 43 and one of pins 44. The two tension springs 45 form spring means which restrain the closing means 20 and the holding means 7 relative to one another.

Owing to the construction described above the closing means 20 and the holding means 7, which are movable relative to one another substantially parallel to the direction of movement 19, are disengageably coupled to one another. Consequently, during the movement of the holding means 7 to its operating position and the resulting movement of closing means 20 to the closed position, the holding means 7 can disengage from the closing means 20 and be moved still further over a comparatively large distance up to its operating position, opposed by the force of the tension springs, after the closing means 20 have reached the closed position.

In the operating condition shown in FIG. 3 a magnetic-tape cassette 34 can be inserted into the drawer-type holding means 7 in a direction substantially parallel to the direction of movement 19. If subsequently the drive means 29 are activated the holding means 7 are drawn into the apparatus 1 in a direction parallel to the direction of movement 19. After a short travel the closing means 20, which are held in the open position shown in FIG. 3 under the influence of gravity, will abut against the front wall 4 of the housing 3 of the apparatus 1, and during the subsequent movement of the holding means 7 the closing means 20 will be pivoted clockwise as a shown in FIG. 3. The movement of the holding means 7 and pivotal movement of the closing means 20 continues until the closing means 20 reaches the closed position as shown in FIG. 4. Thereafter, the holding means 7 is still driven and consequently moved by the drive means 29, the stops 42 then being disengaged from the ends 41 of the slides 37, as a result of which the tension springs 45 are tensioned. After the holding means 7 reaches its operating position it is held there by drive means 29, as a result of which the tension springs 45 will remain tensioned to keep the closing means 20 in the closed position by spring force. Thus, the closing means 20 in the apparatus shown in FIGS. 3 and 4 is held in the closed position in a reliable manner and without play, thereby ensuring an effective closure of the access opening 6 in the front wall 4 of the apparatus 1.

When the drive means 29 is subsequently driven in the reverse sense, causing the drive lever 31 to be pivoted counterclockwise, the holding means 7 is moved from the operating position in FIG. 4 towards the front wall 4. Therefore, under the influence of the tension springs 42 the stops 42 are moved towards the free ends 41 of the slides 37 until the stops 42 abut against the ends 41 of the slides 37. After this, the slides 37 are also moved towards the front wall 4 via the stops 42, which results in a corresponding movement of the closing means 20 under the influence of gravity, so that the closing means 20 resume their open position shown in FIG. 3 once the holding means 7 have reached their loading position.

Figure 5:
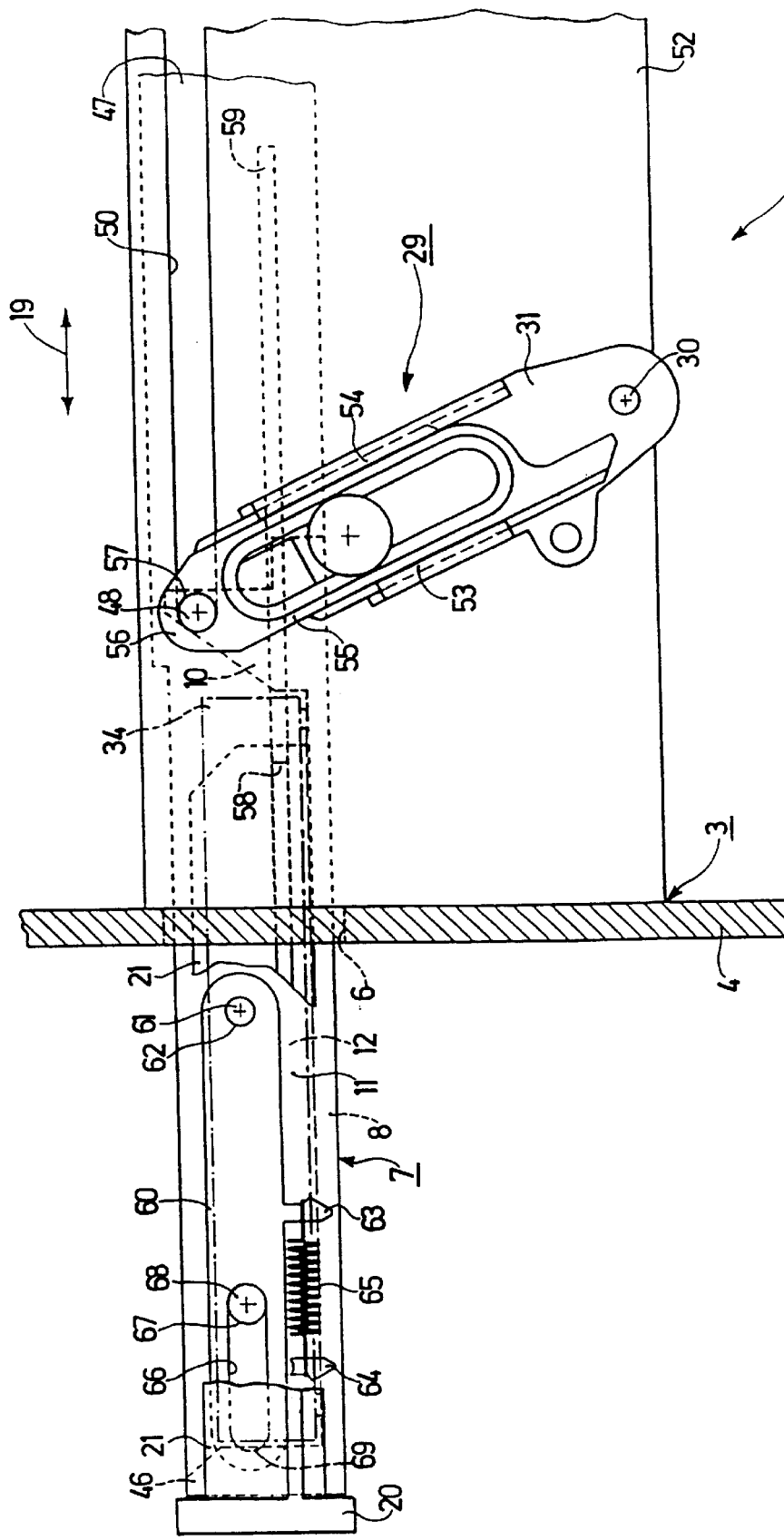
FIG. 5 shows a holding arrangement in accordance with a third embodiment of the invention as used in a recording and reproducing apparatus for a magnetic-tape cassette, only the relevant part of such apparatus being shown. The holding means for holding a magnetic-tape cassette is shown in the loading position and the closing means for closing an access opening in a housing wall of the apparatus is shown in the open position.
Figure 6:
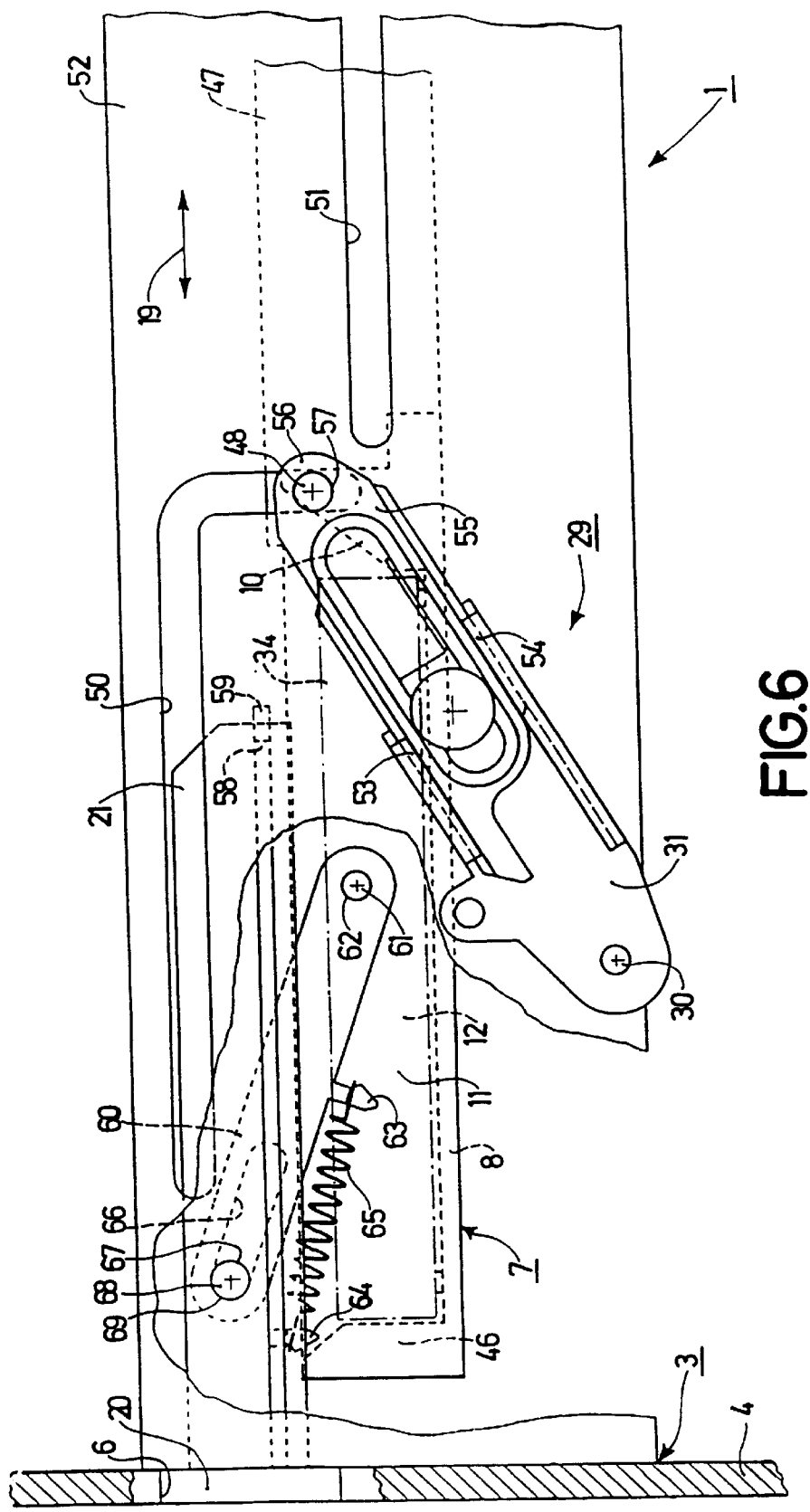
FIG. 6 shows the same recording and reproducing apparatus as in FIG. 5, the holding means being in the operating position and the closing means being in the closed position.
Figure 7:
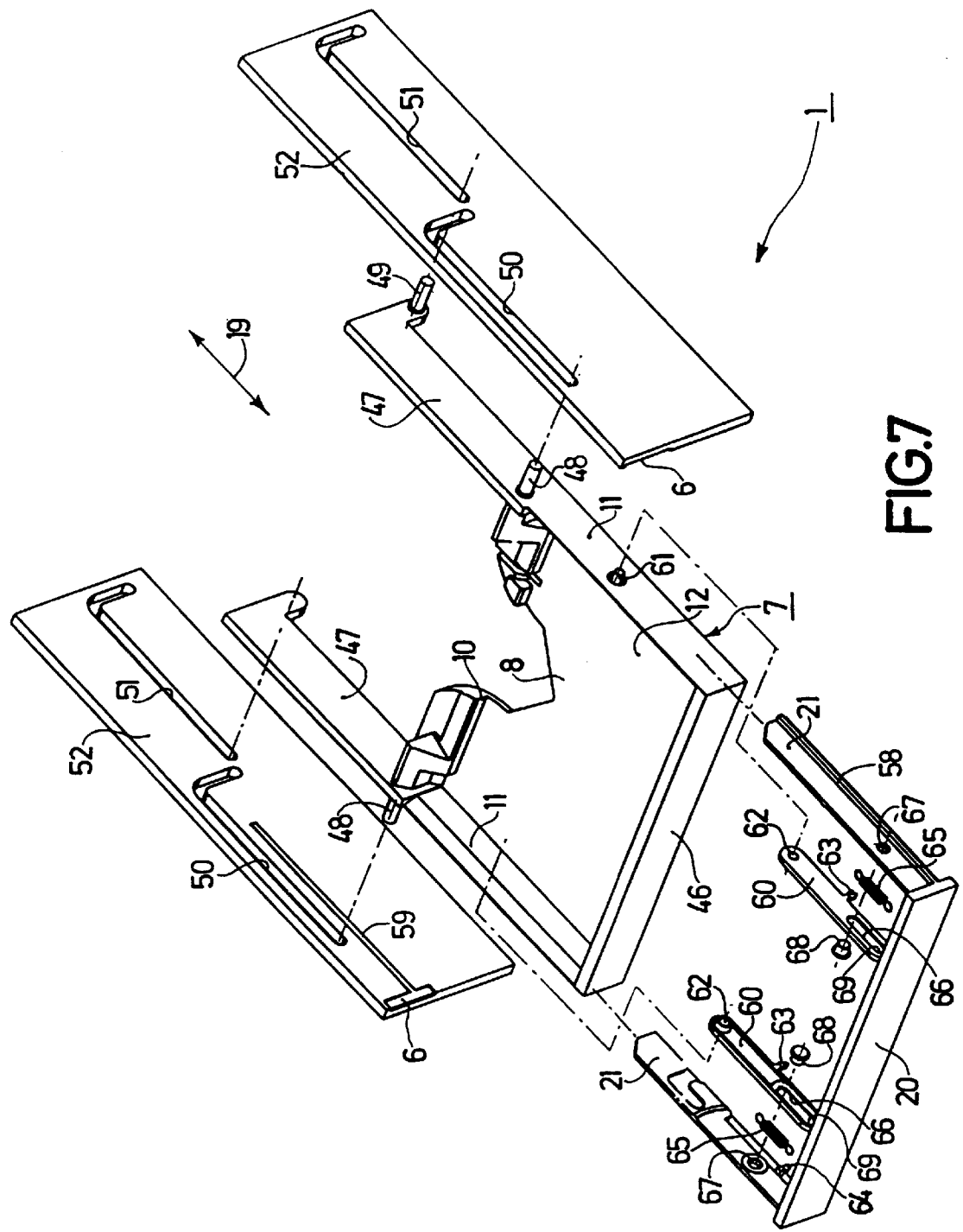
FIG. 7 is an oblique view of a part of the recording and reproducing apparatus shown in FIGS. 5 and 6, including the holding means and the closing means.

FIGS. 5, 6 and 7 show the relevant part of a further holding apparatus 1. It comprises holding means 7, which in the present case take the form of a tray, as is apparent from FIG. 7. The holding means 7 comprise a bottom wall 8, a front wall 46, a rear wall 10 having an interruption, and two side walls 11 each connected to an extension 47 which projects in a direction from the front wall 46 beyond the rear wall 10. Two guide pins 48 and 49 project from each of the side walls 11 and their extensions 47. The guide pins 48 and 49 each traverse L-shaped guide slots 50 and 51, formed in a guide wall 52 which is connected in a manner not shown to the front wall 4 of the housing 3 of the apparatus 1. By means of the guide slots 50 and 51 the holding means 7 are guided so as to be movable along an L-shaped path, the holding means 7 being movable into the operating position parallel to the direction of movement 19 and subsequently also transversely to the direction of movement 19 during a movement of said holding means from their loading position shown in FIG. 5 to their operating position shown in FIG. 6.

The apparatus shown in FIGS. 5 to 6 also comprise drive means 29, which can be driven by a motor, to move the holding means 7. FIGS. 5 and 6 show those parts of the drive means 29 which cooperate directly with holding means 7. These parts include a drive lever 31, which is pivotable about a spindle 30, which projects from one guide wall 52, and which has two L-shaped guide limbs 53 and 54. The guide limbs 53 and 54 guide a further drive lever 55 on the drive lever 31 so as to be movable in the longitudinal direction of the two drive levers 31 and 55. At the location of its free end 56 the further drive lever 55 has a circular hole 57, in which the guide pin 48 engages, so that the guide pin 48 and, consequently, the complete holding means 7 are coupled to the further drive lever 55 and, as a consequence, to the complete drive means 29.

The apparatus 1 shown in FIGS. 5 to 7 further comprises closing means 20, which in the present case are simply formed by a flat panel. Two strip-shaped extensions 21 project perpendicularly from the closing means 20, as is apparent from FIG. 7. In the same way as in the apparatus 1 shown in FIGS. 3 and 4, the closing means 20 and the holding means 7 of the apparatus 1 shown in FIGS. 5 to 7 are disengageably coupled to one another. Moreover, the closing means 20 of the apparatus 1 shown in FIGS. 5 to 7 are guided by guide means so as to be movable parallel to the direction of movement 19 of the holding means 7. The guide means are now disposed between the strip-shaped extensions 21, which are connected to the closing means 20 and which serve as first guide-means supports, and the guide walls 52, which are stationary in the apparatus 1 and which serve as second guide-means supports. The guide means comprise guide limbs 58, which project laterally from the strip-shaped extensions 21, and guideways 59 formed in the guide walls 52.

In the apparatus 1 shown in FIGS. 5 to 7 a lever arm 60 is pivotably mounted on each side wall 11 of the holding means 7. For the pivotable mounting of each lever arm 60 a journal 61 projects from the respective side wall 11 and engages a bore 62 in the lever arm 60. Each lever arm 60 carries a projection 63. Moreover, each strip-shaped extension 21 connected to the closing means 20 carries a further projection 64. A tension spring 65 is arranged between each of the projections 63 and each of the further projections 64. The two tension springs 65 form spring means which restrain the closing means 20 and the holding means 7 relative to one another. The fact that the tension springs 65 act upon the projections 63 of the lever arms 60 has the advantage that the ends by which the tension springs 65 are connected to the projections 63 have to perform a smaller travel in a direction transverse to the direction of movement 19 than the holding means 7.

Each lever arm 60 has a slot 66 which is engaged by a stop pin 68 press-fitted in a bore 67 in each strip-shaped extension 21. The end 69 of each of the two slots 66, which end is remote from the bore 62 and the journal 61, forms a stop which in the operating position of the holding means 7 faces the stop pin 68 connected to the closing means 20 and thus prevents the closing means 20 from being moved out of their closed position shown in FIG. 6 against the force of the tension springs 65.

When after insertion of a magnetic-tape cassette 34, shown diagrammatically in dash-dot lines in FIGS. 5 and 6, the drive means 29 are activated and, as a consequence, the drive levers 31 and 55 are pivoted clockwise as seen in FIG. 5, this results in the holding means 7 being moved in a direction parallel to the direction of movement 19 through the access opening 6 in the front wall 4 of the housing 3 of the apparatus 1. This results in the closing means 20, which bear against the front wall 46 of the holding means 7 under the influence of the tension springs 65, initially being moved along. During the subsequent movement of the holding means 7 the closing means 20 engage in the access opening 6 in the front wall 4, so that the closing means 20 are finally blocked against further movement. The tension springs 65 are then tensioned during the subsequent movement of the holding means. Finally, during the subsequent movement in a direction transverse to the direction of movement 19 the holding means 7 are moved in accordance with the shape of the guide slots 50 and 51, the lever arms 60 being also pivoted. The movement of the holding means 7 in a direction transverse to the direction of movement 19 proceeds until the holding means 7 have reached the operating position shown in FIG. 6, in which a magnetic-tape cassette 34 inserted into the holding means 7 occupies its operating position. In the operating position of the holding means 7 the closing means 20 are held reliably and without play in their closed position by means of the tension springs 65, which guarantees an effective closure of the access opening 6 in the front wall 4 of the housing 3 of the apparatus 1 shown in FIGS. 5 to 7.

When the drive means are subsequently driven in the reverse sense, causing the drive levers 31 and 55 to be pivoted counterclockwise, the holding means 7 are initially lifted transversely to the direction of movement 19 and are then moved parallel to the direction of movement 19 in accordance with the shape of the guide slots 50 and 51 towards the access opening 6 in the front wall 4, the closing means 20 remaining initially in their closed position under the influence of the tension springs 65. When the front wall 46 of the holding means 7 abuts against the closing means 20 as the movement proceeds, the closing means 20 are held against the front wall 46 of the holding means 7 without play under the influence of the force exerted by the tension springs 65 and, subsequently, the closing means 20 together with the holding means 7 are moved until the holding means 7 assume their loading position shown in FIG. 5 and the closing means 20 consequently assume their open position.

The invention is not limited to the three embodiments described above by way of examples. An arrangement in accordance with the invention need not be constructed as an independent apparatus but may alternatively form part of an apparatus; an arrangement in accordance with the invention may, for example, be constructed as a card reader which forms part of a cash dispenser and has been incorporated in such a cash dispenser.

We claim:

1. A holding arrangement for a record storage medium, comprising:

a housing having a wall with an access window therein;

holding means in said housing for holding said record storage medium and which is moveable between (i) a loading position in which the record storage medium is passed through said access window to be loaded into or removed from said holding means, and (ii) an operating position in which the record storage medium is operable for read-out and/or recording of information; movement of said holding means between said positions being at least in part in a first direction which is parallel to a direction of movement through said access window;

closure means in the form of a unitary panel pivotally secured to said holding means and moveable therewith between (i) an open position remote from the access window when the holding means is moved to said loading position, and (ii) a closed position covering the access window when the holding means is moved to said operating position;

spring means coupled between said closure means and said holding means for exerting tensile spring force there-between which (i) restrains the closure means from pivoting to said closed position thereof when the holding means is in said loading position, and (ii) restrains the closure means from pivoting to said open position thereof when the holding means is in said operating position; and means for mechanically de-coupling the closure means from the holding means when (i) the closure means has reached its open position and the holding means has not yet reached the loading position thereof, and (ii) the closure means has reached its closed position and the holding means has not yet reached the operating position thereof.

2. A holding arrangement as claimed in claim 1, wherein during movement of the holding means into the loading position the closure means is translated and pivoted under the combined influence of said holding means and said spring means until the closure means reaches the closed position thereof.

3. A holding arrangement as claimed in claim 2, wherein the holding means has a stop against which the closure member is held, when in the open position, by the tensile spring force of said spring means.

4. A holding arrangement as claimed in claim 1, wherein the closure means and the holding means are disengageably coupled together and during movement of the holding means into the operating position and the resulting movement of the closure means into the closed position the holding means disengages from the closing means and moves into the operating position opposed by the force of said spring means after the closure means reaches the closed position thereof.

5. A holding arrangement as claimed in claim 4, further comprising guide means for guiding movement of the closure means relative to the holding means in said first direction.

6. A holding arrangement as claimed in claim 5, wherein said guide means are disposed between first guide-means supports which are connected to the closure means and second-guide means supports which are mounted in stationary position in said arrangement.

7. A holding arrangement as claimed in claim 6, wherein after disengagement of the holding means from the closure means opposed by the force of said spring means, the holding means is additionally moveable into the operating position by movement transversely to scud first direction.

8. A holding arrangement as claimed in claim 7, further comprising at least one lever arm pivotably mounted on the holding means, said lever arm being subjected to spring force by said spring means.

9. A holding arrangement as claimed in claim 8, wherein said lever arm carries a stop which, when the holding means is in the operating position, faces an associated stop connected to the closure means, the stop on the lever arm thereby preventing the closure means from moving out of the closed position in opposition to the force of said spring means.

* * * * *